United States Patent

[11] 3,539,042

[72] Inventor Columbus R. Sacchini
 Willowick, Ohio
[21] Appl No 811,768
[22] Filed April 1, 1969
[45] Patented Nov. 10, 1970
[73] Assignee The Marquette Metal Products Co.
 a corporation of Ohio

[54] SPRING CLUTCH ROTARY TRANSMISSION ASSEMBLY
 8 Claims, 4 Drawing Figs.
[52] U.S. Cl. .................................................. 192/48.92,
 192/36, 192/41
[51] Int. Cl. ................................................. F16d 41/20,
 F16d 47/04
[50] Field of Search ................................................. 192/36,
 41(S), 48.91, 48.92

[56] References Cited
UNITED STATES PATENTS
2,622,450 12/1952 Gorske et al. ................. 192/41(S)UX
2,885,896 5/1959 Hungerford et al. .......... 192/48.92
3,008,558 11/1961 Bennett et al. ................ 192/48.91

Primary Examiner—Allan D. Hermann
Attorney —Arthur Frederick and Victor D. Behn

ABSTRACT: A spring clutch rotary transmission assembly wherein two normally disengaged spring clutches are connected, one to each of two independent sources of rotary power, and to a single device to be driven, the spring clutches being constructed and arranged in relation to each other to automatically cause one of the spring clutches to engage and thereby effect transmission of rotation from one source of rotary power to the driven device while the other clutch automatically remains in a disengaged operative condition.

INVENTOR.
COLUMBUS R. SACCHINI
BY
ATTORNEY 3,539,042

1

SPRING CLUTCH ROTARY TRANSMISSION ASSEMBLY

BACKGROUND OF INVENTION

This invention relates to rotary transmission mechanisms for alternately driving a driven member from different sources of rotary power. More specifically, the invention relates to two spring clutches cooperatively associated with two independent driving means and a common driven means to alternately effect the driving of the common driven means by each of the independent driving means.

In refrigerated vehicles, such as trucks or railroad cars, it is necessary to provide for driving the refrigerant compressor while the vehicle is in motion or parked. While the vehicle is in motion the compressor is driven by the propulsion motor, such as the diesel engine of the truck, and, when parked, connected to be driven by an electric motor. In these installations, clutches are employed to engage the compressor shaft with one or the other sources of rotary power. Heretofore, these clutches have not had a desirably long operative life and operator-controlled mechanisms had to be provided to effect the engagement and disengagement of the clutches.

Accordingly, it is an object of this invention to provide a spring clutch rotary transmission assembly for automatically driving a drive shaft alternately from different sources of rotary power.

Another object of the present invention is to provide a spring clutch rotary transmission assembly for driving a drive shaft alternately from different sources of rotary power, which assembly has a relatively long operative life.

A feature of this invention is the use of two spring clutches so constructed and arranged that each is normally disengaged from the common driven means and self-energized to an engaged position when driven by the source of rotary power to which it is connected.

SUMMARY OF INVENTION

Accordingly, the present invention contemplates a novel spring clutch, rotary transmission assembly which comprises two normally disengaged spring clutches connected to a common driven means and to separate and independent sources of rotary power. Each of the spring clutches may be of the type disclosed in the copending U.S. Pat. appliction, Ser. No. 779,919 filed Nov. 29, 1968, wherein a one-way clutch means is associated with a control sleeve to effect energization of the helical spring and engagement of the input and output portions of the clutch upon rotation in a preselected direction. The helical spring of each of the clutch means is wound in a direction so that, when the control sleeve is held against rotation by the one-way clutch means, the spring is caused to contract and grip the output portion of the spring clutch to thereby effect transmission of rotation to the driven means. The two clutches are constructed and arranged in relationship to each other, the sources of rotary power and the driven means, to provide for automatically holding the control sleeve of one of the clutches against rotation and, hence, the engagement of this one clutch while the control sleeve of the other clutch is free to rotate, and, therefore, disengagement of the other clutch is maintained. Thus, the clutch which is being driven by its associated source of rotary power is automatically placed in an engaged condition of operation while the other clutch is automatically maintained in a disengaged operative position.

BRIEF DESCRIPTION OF THE DRAWINGS

The invention will be more fully understood from the following description when considered in connection with the accompanying drawings in which.

2

Figures 1, 3, 4:
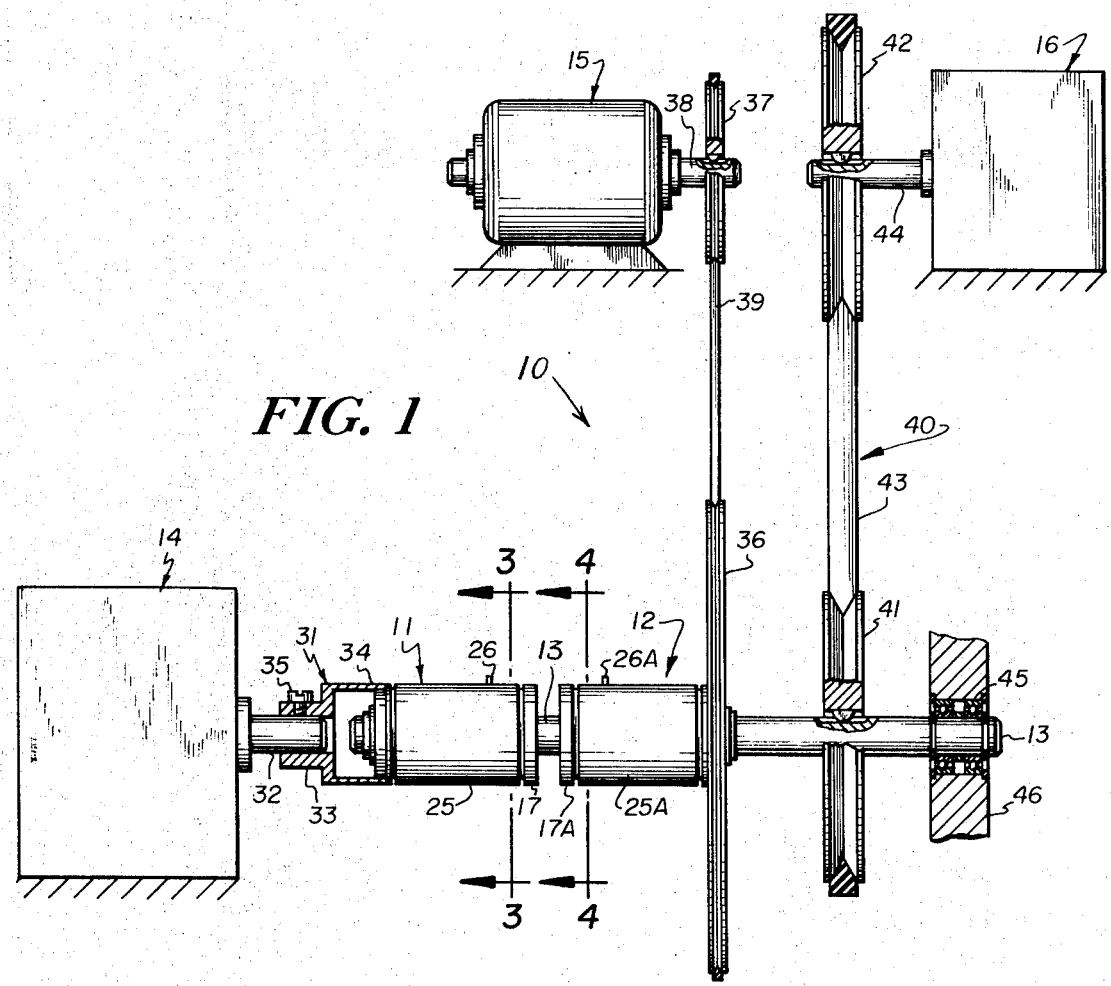
FIG. 1 is an elevational view of the spring clutch, rotary power transmission assembly, according to this invention with some parts somewhat schematically shown.

FIG. 3 is a cross-sectional view taken along line 3—3 of FIG. 1; and

FIG. 4 is a view in cross section taken along line 4—4 of FIG. 1.

DESCRIPTION OF THE PREFERRED EMBODIMENT

Now referring to the drawing, and more particularly to FIG. 1, reference number 10 generally designates the spring clutch, rotary power transmission assembly of this invention which is particularly suitable for vehicular mounted refrigeration systems for driving the refrigerated compressor or compressors, although the assembly is not limited in application to such use.

The transmission assembly 10 comprises two spring clutches 11 and 12 mounted on and connected to a common driven means, such as shaft 13, the clutches 11 and 12 being connected, respectively, to a primary source of rotary power, such as a diesel engine 14 of a refrigerated truck, and to another or auxiliary source of rotary power, such as an electric motor 15. A unit to be driven, such as a refrigerant compressor 16, is connected to shaft 13 to be rotatively driven by the latter.

Figure 2:
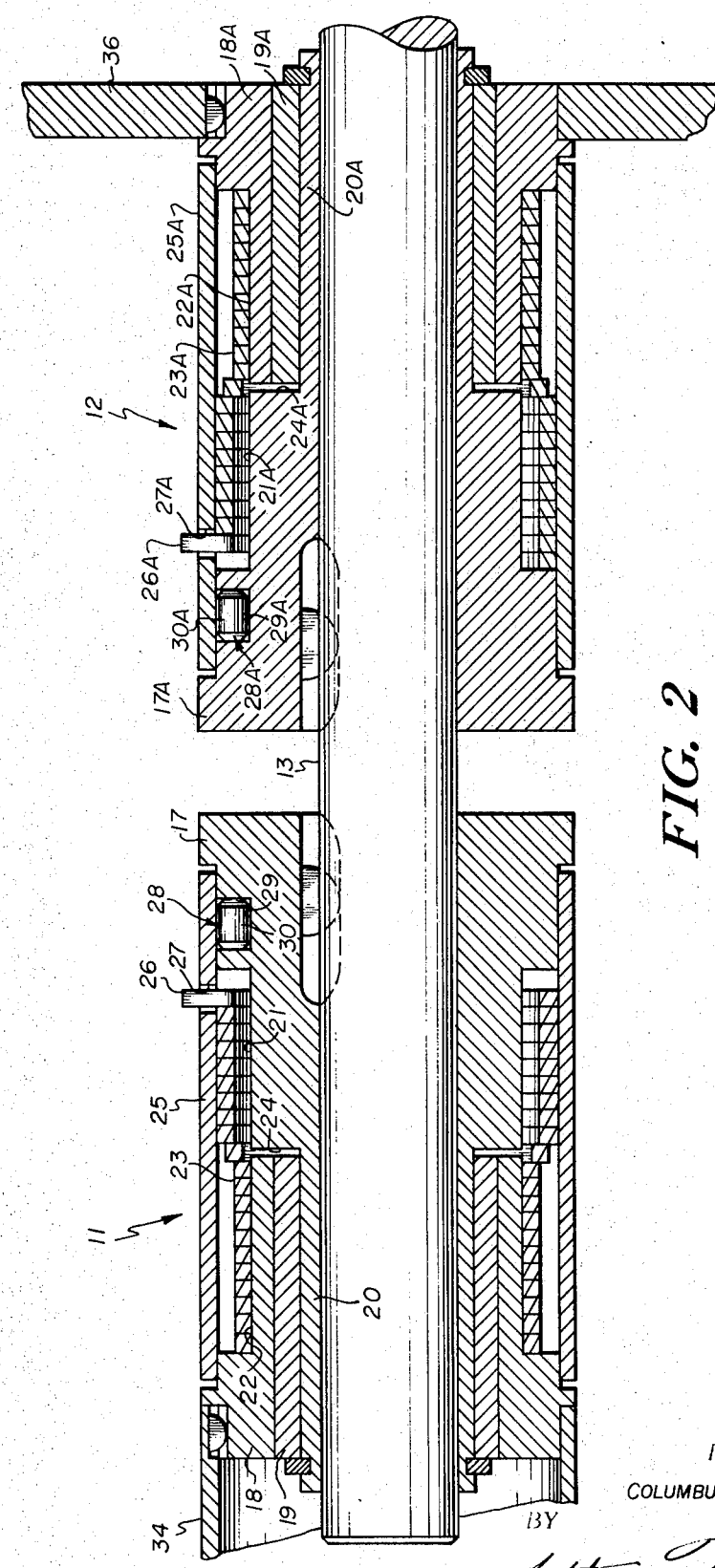
FIG. 2 is an enlarged fragmentary view in cross section of the spring clutches which form part of the assembly shown in FIG. 1.

As best shown in FIG. 2, each of the spring clutches 11 and 12 is preferably of the construction disclosed in copending U.S. Pat. application Ser. No. 779,919 filed Nov. 29, 1968, wherein energization and engagement of the helical spring is regulated by a control sleeve which, in turn, is controlled by a one-way clutch means forming part of the spring clutch assembly. Since spring clutches 11 and 12 are substantially of the same construction, only spring clutch 11 will be described in detail and parts of spring clutch 12, corresponding to like parts of spring clutch 11, will be identified by the same number, but with the suffix A added thereto.

The spring clutch 11 comprises an output member 17 keyed or otherwise suitably secured to shaft 13. An input member 18 is supported for rotation relative to the output member 17 on a sleeve bearing 19 mounted on a reduced diameter portion 20 of the output member. The output member 17 and input member 18 have coextensive peripheral friction surfaces 21 and 22, respectively, adapted to be engaged by a helical spring 23 which is disposed coaxially over the surfaces and spanning the crossover gap 24 between the input and output members. The spring 23 is dimensioned to be in interference fitting relationship with surface 22 of input member 18 or in some other suitable manner connected to surface 22 and out of engagement with surface 21 of output member 17. The spring is formed with a right-hand spiral, assuming the desired direction of rotation of shaft 13 is clockwise. (Here and wherever else direction of rotation is set forth, it is to be understood that the direction of movement is as seen when viewing the assembly from the right as illustrated in FIGS. 1 and 2.) A cylindrical control sleeve 25 is rotatively supported, at opposite end portions, upon the input and output members and in coaxial relationship with spring 23. The spring portion adjacent surface 21 of output member 17 is connected to the control sleeve 25 by a toe portion 26 receivable in a hole 27 in the control sleeve. Instead of the hole and toe interconnection between the spring and control sleeve 25, the spring can be a full "free-floating" spring wherein the spring portion adjacent surface 21 is in interference fit with the inner peripheral surface of control sleeve 25, without departure from the scope and spirit of this invention. A one-way clutch means 28 for automatically regulating the rotation of control sleeve 25 is incorporated in the clutch assembly, which control means, preferably comprises at least one tapered groove 29 in output member 17 and a spring biased ball or roller 30 disposed in the groove so that in one direction (counterclockwise) control sleeve 25 is free to rotate with spring 23 and input member 18, and in the opposite direction (clockwise), with roller 30 wedged between the bottom of groove 29 and the inner surface of control sleeve 25, the control sleeve is locked to the output member 17. When the control sleeve is locked to output member 17, clockwise rotation of input member 18 will cause spring 23 to contract and grip surface 21 of the output member 17 to thereby engage the clutch assembly and transmit rotation of the input member 18 to the shaft 13, through output member 17. When the rotation of input member 18 ceases, the spring is free to expand and release its grip on surface 21 so that control sleeve 25 is free to rotate in a counterclockwise direction under the urging of spring 23.

The spring clutch 12 is mounted on and connected to shaft 13 in juxtaposed relationship with spring clutch 11. As previously stated, spring clutch 12 is of substantially the same construction as spring clutch 11 except that helical spring 23A of spring clutch 12 is formed with a left-hand spiral instead of the right-hand spiral form of helical spring 23 of spring clutch 11.

To provide for rotatively driving input member 18 of spring clutch 11, a driving collar 31 is connected to the input member 18 and to a shaft 32 which is drivably connected to the diesel engine 14. As shown, driving collar 31 has a cylindrical shank portion 33 receivable on shaft 32 and an enlarged cup-shaped portion 34 which is dimensioned to overlie a portion of the outer peripheral surface of input member 18. The cylindrical shank portion 33 is shown secured to shaft 32 by a setscrew 35, (see FIG. 1), but may be keyed or in some other suitable manner connected for conjoined rotation with shaft 32. The cup-shaped portion 34 is illustrated as secured to input member 18 by a key and keyway assembly, but may be connected in some other suitable manner, to the input member without departing from the scope and spirit of the invention.

Similar to spring clutch 11, the input member 18A of spring clutch 12 is driven by a sheave or pulley wheel 36 which is keyed or secured by some other suitable means, to the input member 18A. As shown in FIG. 1, pulley wheel 36 is rotatively connected by a belt 39 to a drive pulley wheel 37 which is mounted on the shaft 38. Obviously, rotation of motor shaft 38 effects rotation of pulley wheel 37 which, in turn, drives pulley wheel 36, through belt 39. While input member 18A is shown and described as rotatively driven by motor 15, through a pulley wheel and belt assembly, it is to be understood that the invention is not limited to such a drive means. Manifestly, input member 18A can be driven through a gear train or the like without departure from the scope and spirit of this invention.

The refrigerant compressor 16, for purposes of illustration only, is shown as driven by shaft 13 through a pulley wheel and belt assembly 40, and it is to be understood that some other suitable rotary drive mechanism may be employed, such as a gear train, without departure from the concept of the invention. The pulley wheel and belt assembly 40 comprises a sheave or pulley wheel 41 drivably connected to a sheave or pulley wheel 42 by a belt 43. The pulley wheel 41 is connected to shaft 13 by keying or other suitable means while pulley wheel 42 is connected to the compressor shaft 44 also by any suitable means, such as keying or the like.

The shaft 13 is supported for rotation in any suitable manner, such as by being journaled at one end in a bearing 45 mounted on a fixed support member 46 and, at the opposite end, in bearings (not shown) associated with the diesel engine 14, through clutch 11, drive collar 31 and shaft 13.

In operation of the spring clutch, rotary transmission assembly 10 described herein, it is desired to drive refrigerant compressor 16 by diesel engine 14, motor 15 is in a nonoperative condition and shaft 32 is driven clockwise by operation of diesel engine 14. The rotation of shaft 32 causes conjoined rotation of drive collar 31 which, in turn, rotates input member 18 in a clockwise direction. This rotation of input member 18 rotatively carries spring 23 in a clockwise direction and moves control sleeve 25 clockwise. As best seen in FIG. 3, clockwise movement of control sleeve 25 causes roller 30 of the one-way clutch means 28 to be wedged between the bottom of groove 29 and the inner surface of control sleeve 25 thereby locking the control sleeve against rotation. The locking of control sleeve 25 causes input member 18 to rotate relative to control sleeve 25 and, since spring 23 is anchored at toe 26 to the control sleeve 25 and has a righthand spiral construction, the spring will contract and grip surface 21 of output member 17. With spring 23 gripping output member 17, the clutch is engaged and rotation is transmitted from input member 18 to output member 17. Thus, rotation of output member 17 effects rotation of shaft 13 and the refrigerant compressor 16 through the pulley wheel and belt assembly 40.

With the clockwise rotation of shaft 13, output member 17A of spring clutch 12 is rotated also in a clockwise direction by reason of keyed interconnection of the output member and the shaft. As best understood by viewing FIG. 4, clockwise rotation of output member 17A tends to release the one-way clutch means 28A by causing the roller 30A to move out of wedging relationship with the control sleeve and bottom of groove 29A. Also if there is any rotation of control sleeve 25A by reason of its frictional engagement with output member 17A which tends to urge roller 30A to a wedging or locking position, such action is counteracted by clockwise rotation of output member 17A. This counteraction is the result of toe 26A of spring 23A not being held against rotation relative output member 17A and the spring 23A being formed with a lefthand spiral, which factors combine to prevent the contraction of the coils of the spring about output member 17A, thus clutch 12 remains disengaged.

When it is desired to operate refrigerant compressor 16 by auxiliary rotary power means, such as electric motor 15, diesel engine 14 is shut-down and electric motor 15 operated. With the electric motor operating, shaft 38 is rotated in a clockwise direction and its rotation transmitted to shaft 13, via wheel pulleys 37 and 36 and belt 39. The clockwise rotation of input member 18A has the effect of carrying spring 23A in a clockwise direction, which spring, through toe 23A, causes control sleeve 25A to move in a clockwise direction. As best seen in FIG. 4, this movement of control sleeve 25A relative to output member 17A which is now stationary, forces roller 30A into wedging relationship with the control sleeve and output member to thereby lock control sleeve 25A against rotation. With control sleeve 25A held against rotation relative to output member 17A, the spring by reason of its left hand spiral construction, will contract and grip surface 21A of the output member to thus effect engagement of the clutch and transmission of rotation to the output member 17A. The rotation of output member 17A in a clockwise direction rotates shaft 13 in a clockwise direction. Thus, with shaft 13 being rotated, refrigerant compressor 16 is driven through pulley wheel and belt assembly 40.

During rotation of shaft 13 by reason of engagement of spring clutch 12, spring clutch 11 remains disengaged because clockwise rotation of output member 17 of clutch 11 maintains one-way clutch means 28 in a disengaged condition so that spring 23 is not energized into engagement. With spring clutch 11 maintained in a disengaged position, diesel engine 14 is automatically, rotatively disconnected from shaft 13.

It is not essential that one power source or drive means, either diesel engine 14 or electric motor 15, be completely shut down before the other is made operative. If it happens that motor drive means 14 and 15 operating simultaneously or one of the motor drive means is coasting to a stop when the other is made operative no damage will occur since the spring clutches 11 and 12 will function to cause the drive means operating at the greater angular velocity to override the other drive means and thereby affect driving of shaft 13. Even though it would be exceedingly rare to have both motor drive means operating at identical angular velocities, it is preferable to provide an electrical safety device or the like to prevent operation of one motor drive means while the other is functioning.

It is now believed readily apparent that the spring clutch, rotary transmission assembly, herein described provides an automatic clutching means for providing the drive of a member through alternate sources of rotary power. It is an assembly that has a relatively long operative life because the only significant area of wear is at the clutch bearings 20 and 20A when the inoperative clutch is in its disengaged position.

Although but one embodiment of the invention has been illustrated and described in detail, it is to be expressly understood that the invention is not limited thereto. Various changes can be made in the arrangement of parts without departing from the spirit and scope of the invention as the same will now be understood by those skilled in the art.

I claim:

1. A spring clutch rotary power transmission assembly comprising:
   a. a first source of rotary power;
   b. a second source of rotary power independent of said first source;
   c. an output means drivably connected to a device to be rotated in a preselected direction;
   d. a first normally disengaged spring clutch connected to said first source of rotary power and to said output means to automatically engage and transmit rotation from the first source of power to said output means upon rotation in the preselected direction and maintain disengagement upon rotation in a direction opposite to the preselected direction;
   e. a second normally disengaged spring clutch connected to said second source of rotary power and to said output means to automatically engage and transmit rotation from the second source of rotary power to the output means upon rotation in the preselected direction and maintain disengagement upon rotation; and
   f. said first and second spring clutches each include a one-way clutch means responsive to rotation of the associated power source in the preselected direction of rotation to effect energization and engagement of the associated first or second spring clutch while the other spring clutch remains disengaged.

2. The apparatus of claim 1 wherein said first and second spring clutches are of like construction and connected to the output means in mirror image relationship to each other.

3. The apparatus of claim 1 wherein said output means includes a shaft on which the said first and second spring clutches are mounted and connected for rotation.

4. In combination with a first and a second source of rotary power and driven means to be rotatively driven alternately by said first and second sources of rotary power, a spring clutch transmission assembly comprising:
   a. an output means connected to said driven means to be rotated in a predetermined direction;
   b. a first and a second normally disengaged spring clutch connected to the output means;
   c. said first and second spring clutches, each comprising:
      i. an input member mounted for rotation,
      ii. an output member adjacent said input member and supported for rotation relative to the input member,
      iii. a spring for transmitting and interrupting rotation between the input and output members, and
      iv. control means including one-way clutch means for causing the spring to rotatively engage said input and output members only upon rotation of the input member in a predetermined direction;
   d. said input member of said first spring clutch being connected for rotation to said first source of rotary power;
   e. said input member of said second spring clutch being connected for rotation to said second source of rotary power;
   f. the output members of each of said first and second spring clutches being connected to rotate said output means; and
   g. said first and second spring clutches being arranged in a mirror image relationship with each other so that the one-way clutch means upon rotation of the input member of either spring clutch in the predetermined direction will automatically cause the engagement of the associated spring and input and output members and maintenance of disengagement of the spring with respect to the output member when the output member is rotated by the output means to thereby provide rotation of said driven means in the predetermined direction alternately by said first and second sources of rotary power.

5. The apparatus of claim 4 wherein said output means includes a shaft journaled for rotation about its longitudinal axis.

6. The apparatus of claim 4 wherein said control means includes a control sleeve coacting with the one-way clutch means to control rotation of the control sleeve relative to the output member.

7. The apparatus of claim 4 wherein a direct rotary drive assembly connects said first source of rotary power and said first spring clutch.

8. The apparatus of claim 4 wherein a direct rotary drive assembly interconnects the second source of rotary power with the second spring clutch.